(12) United States Patent
Thambiratnam et al.

(10) Patent No.: US 8,027,977 B2
(45) Date of Patent: Sep. 27, 2011

(54) RECOMMENDING CONTENT USING DISCRIMINATIVELY TRAINED DOCUMENT SIMILARITY

(75) Inventors: Albert J. K. Thambiratnam, Beijing (CN); Frank T. B. Seide, Beijing (CN); Peng Yu, Beijing (CN); Lie Lu, Beijing (CN)

(73) Assignee: Microsoft Corporation, Redmond, WA (US)

( * ) Notice: Subject to any disclaimer, the term of this patent is extended or adjusted under 35 U.S.C. 154(b) by 225 days.

(21) Appl. No.: 11/765,653

(22) Filed: Jun. 20, 2007

(65) Prior Publication Data

US 2008/0319973 A1 Dec. 25, 2008

(51) Int. Cl.
G06F 7/00 (2006.01)
G06F 17/30 (2006.01)
(52) U.S. Cl. ...................................................... 707/736
(58) Field of Classification Search .................. 707/2, 6, 707/736, 706, 748
See application file for complete search history.

(56) References Cited

U.S. PATENT DOCUMENTS

| | | | |
|---|---|---|---|
| 5,974,412 A | 10/1999 | Hazlehurst et al. | |
| 6,301,577 B1 | 10/2001 | Matsumoto et al. | |
| 6,493,702 B1 | 12/2002 | Adar et al. | |
| 6,567,797 B1 | 5/2003 | Schuetze et al. | |
| 6,611,842 B1 | 8/2003 | Brown | |
| 6,687,696 B2 * | 2/2004 | Hofmann et al. | 707/6 |
| 6,845,374 B1 | 1/2005 | Oliver et al. | |
| 7,076,443 B1 * | 7/2006 | Emens et al. | 705/14 |
| 7,185,001 B1 | 2/2007 | Burdick et al. | |
| 7,185,008 B2 * | 2/2007 | Kawatani | 1/1 |
| 7,389,288 B2 * | 6/2008 | Chickering et al. | 707/4 |
| 2002/0042793 A1 * | 4/2002 | Choi | 707/6 |
| 2004/0068486 A1 * | 4/2004 | Chidlovskii | 707/3 |
| 2005/0086205 A1 | 4/2005 | Franciosa et al. | |
| 2006/0059144 A1 | 3/2006 | Canright et al. | |

OTHER PUBLICATIONS

Strohman, T., Croft, W. B., Jensen, D. "Recommending Citations for Academic Papers," CIIR Technical Report IR-466, 2006.
Olsson, T. 1998b. *Decentralized Social Filtering based on Trust*. In: AAAI-98 Recommender Systems Workshop Papers. Technical Report WS-98-08. pp. 34-88. AAAI Press.
Applying Collaborative Filtering for Efficient Document Search, Seikyung Jung; Juntae Kim; Herlocker, J.L., Web Intelligence, 2004. WI 2004. Proceedings. IEEE/WIC/ACM International Conference on Volume, Issue , Sep. 20-24, 2004 pp. 640-643.
Content-based Collaborative Information Filtering: Actively Learning to Classify and Recommend Documents, Lecture Notes in Computer Science; vol. 1435, Proceedings of the Second International Workshop on Cooperative Information Agents II, Learning, Mobility and Electronic Commerce for Information Discovery on the Internet, pp. 206-215, Year of Publication: 1998, ISBN::3-540-64676-0.

(Continued)

*Primary Examiner* — Greta Robinson
*Assistant Examiner* — Jeffrey Chang
(74) *Attorney, Agent, or Firm* — Westman, Champlin & Kelly, P.A.

(57) ABSTRACT

A generalized discriminative training framework for reconciling the training and evaluation objectives for document similarity is provided. Prior information about document relations and non-relations, are used to discriminatively train an ensemble of document similarity classification models. This result is a model set that can be used to compute similarity between seen documents in the training sets and new documents. The measure of similarity forms the basis of recommending documents to a user as well as being able to obtain metadata information such as keywords and tags for new documents not having such information.

19 Claims, 11 Drawing Sheets

OTHER PUBLICATIONS

Scott C. Deerwester, Susan T. Dumais, Thomas K. Landauer, George W. Furnas, and Richard A. Harshman, "Indexing by latent semantic analysis," *Journal of the American Society of Information Science*, vol. 41, No. 6, pp. 391-407, 1990.

Thomas Hofmann, "Probabilistic latent semantic analysis," in *Proc. of Uncertainty in Artificial Intelligence, UAI'99*, Stockholm, 1999.

A. Biem, "Minimum classification error training for online handwriting recognition," *Pattern Analysis and Machine Intelligence, IEEE Transactions on*, 2006.

J. A. Lasserre, C. M. Bishop, and T. P. Minka, "Principled hybrids of generative and discriminative models," in *Computer Vision and Pattern Recognition, 2006 IEEE Computer Society Conference on*, 2006.

Biing-Hwang Juang, Wu Hou, and Chin-Hui Lee, "Minimum classification error rate methods for speech recognition," in *Speech and Audio Processing, IEEE Transactions on*, 1997.

D. Povey and P.C. Woodland, "Minimum phone error and ismoothing for improved discriminative training," in *Acoustics, Speech, and Signal Processing, 2005. Proceedings. IEEE International Conference on*, 2002.

S. Katagiri, Biing-Hwang Juang, and Chin-Hui Lee, "Pattern recognition using a family of design algorithms based upon the generalized probabilistic descent method," *Proceedings of the IEEE*, 1998.

Strohman, T., Croft, W. B., Jensen, D. "Recommending Citations for Academic Papers," CIIR Technical Report IR-466, 2006.

Olsson, T. 1998b. *Decentralized Social Filtering based on Trust*. In: AAAI-98 Recommender Systems Workshop Papers. Technical Report WS-98-08. pp. 84-88. AAAI Press.

Content-based Collaborative Information Filtering: Actively Learning to Classify and Recommend Documents, Lecture Notes in Computer Science; vol. 1435, Proceedings of the Second International Workshop on Cooperative Information Agents II, Learning, Mobility and Electronic Commerce for Information Discovery on the Internet, pp. 206-215, Year of Publication: 1998, ISBN:3-540-64676-0.

Applying Collaborative Filtering for Efficient Document Search, Seikyung Jung; Juntae Kim; Herlocker, J.L., Web Intelligence, 2004. WI 2004. Proceedings. IEEE/WIC/ACM International Conference on Volume, Issue, Sep. 20-24, 2004 pp. 640-643.

\* cited by examiner

RECOMMENDING CONTENT USING DISCRIMINATIVELY TRAINED DOCUMENT SIMILARITY

BACKGROUND

The discussion below is merely provided for general background information and is not intended to be used as an aid in determining the scope of the claimed subject matter.

The World Wide Web is a large and growing source of information. Typically, information is found using one of two access modes: search and recommendation. Using a search technique, a user queries a database, receives a list of results, and selects from the list to view the information. In contrast, using a recommendation technique, a user is presented with a set of recommended documents from which they can pick the information of interest. The source of the recommended information can either be manually generated (for example, by another who likes similar information) or automatically using techniques such as user data mining, collaborative filtering or social networking.

The search technique for obtaining information is a more powerful method for finding information a user is specifically interested in. However, the recommendation technique is much more useful when the user would rather review information in a less active role. For instance, using this technique, the user may move from one topic of information to another and then to another based on recommended documents. However, the recommended documents could also include those providing yet further details about the current information being reviewed. In this manner, the user can selectively delve deeper into the current subject of information. In either case, the user is not actively searching for content using queries as described above, but rather is allowed to be "surprised" with the interesting information that is either automatically recommended or manually collated by another.

SUMMARY

This Summary and the Abstract herein are provided to introduce a selection of concepts in a simplified form that are further described below in the Detailed Description. This Summary and the Abstract are not intended to identify key features or essential features of the claimed subject matter, nor are they intended to be used as an aid in determining the scope of the claimed subject matter. The claimed subject matter is not limited to implementations that solve any or all disadvantages noted in the background.

A generalized discriminative training framework for reconciling the training and evaluation objectives for document similarity is provided. Prior information about document relations and non-relations, are used to discriminatively train an ensemble of document similarity classification models. This supervised information source is then used to train the modelset to not only learn how to better classify related documents, but additionally, to reduce competition with classifiers of unrelated documents.

A recommendation system uses the modelset to calculate the similarity of a new document (outside the training set) with each of the documents of the training set, providing, if desired, at least one recommended document from the training set that is similar to the new document. The recommendation system uses a measure of similarity based on discriminatively trained parameters associated with each document of the training set. The parameters include but are not limited to weighting factors and mean vectors to name just a few.

In a further embodiment, metadata for a new document can be obtained from a plurality of documents, where each document has metadata associated therewith. In particular, metadata is determined based on ascertaining a similarity score of the new document relative to each of the documents of the plurality of documents using a measure of similarity associated with each document of the plurality of documents. In a first embodiment, the metadata comprises keywords where keywords for the new document are obtained by decomposing the similarity scores. In a second embodiment, the metadata comprises tags, where tags for the new document are inferred from the documents having the highest similarity scores.

DETAILED DESCRIPTION

Document-to-document similarity is a technique commonly used to ascertain the relevance of documents for basing recommendations in a recommendation system. Herein, "document" should be considered broadly and can include video documents, audio documents, pictures, textual files, etc. Besides the information embodied in the specific type of content (e.g. video, audio and/or textual data), information pertaining to relevance further includes metadata associated with the document.

Figure 1:
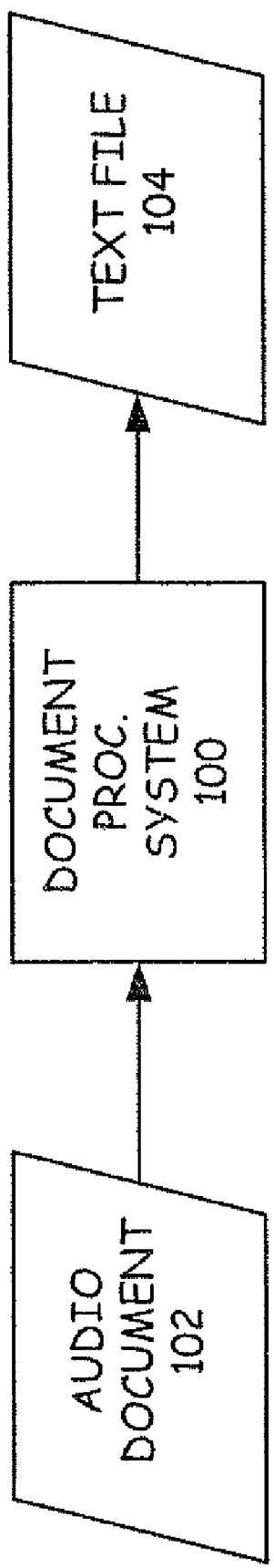
FIG. 1 is block diagram of a transcription system.

Commonly, at least a portion of the document or the entire document is used for retrieving similar or relevant documents from a corpus. However, at this point it should also be pointed out that in some embodiments, it may be helpful to process at least a portion of the document to place the information in a convenient form for analysis. FIG. 1 generally illustrates a system 100 for processing a document, herein by way of example an audio document 102. System 100 includes suitable circuitry (not shown) for receiving the audio document as well as a processing module (herein a speech recognition module) for generating a text file 104 having terms pertaining to the audio in the audio document 102. System 100 can be used to process document(s) prior to operation of a recommendation system used to recommend documents to a user and/or concurrently therewith.

In the illustrative example herein described, FIG. 1 depicts that the text file 104 that is obtained is a transcription of the audio information in document 102. As described below, it is this transcription, in one embodiment, that can be used as a basis for ascertaining similarity with other documents. However, it should be noted obtaining a transcription and using text is just one exemplary basis in which to compare documents. In particular, documents can be compared based on other features such as but not limited to detecting and forming a list of objects in documents having pictures. Accordingly, in other embodiments as desired, system 100 can include suitable modules and/or circuits to perform "feature extraction" from documents, where such features can be used as a basis for ascertaining the similarity of documents, and therefore, can take numerous forms.

Having obtained a text file, a well-known text-domain technique(s), such as Vector Space Modeling (VSM), Latent Semantic Analysis (LSA) or Probabilistic Latent Semantic Analysis (PLSA), is then used to compute document similarity. A fundamental issue in many document similarity techniques is the mismatch between modeling and evaluation objectives. For example, both LSA and PLSA model a document using a document-word co-occurrence matrix, however this criteria is not directly related to the document similarity task. VSM is a heuristic approach for computing similarity. Mismatch between modeling and evaluation objectives leads to sub-optimality, and reconciling these differences is beneficial.

Figure 2:
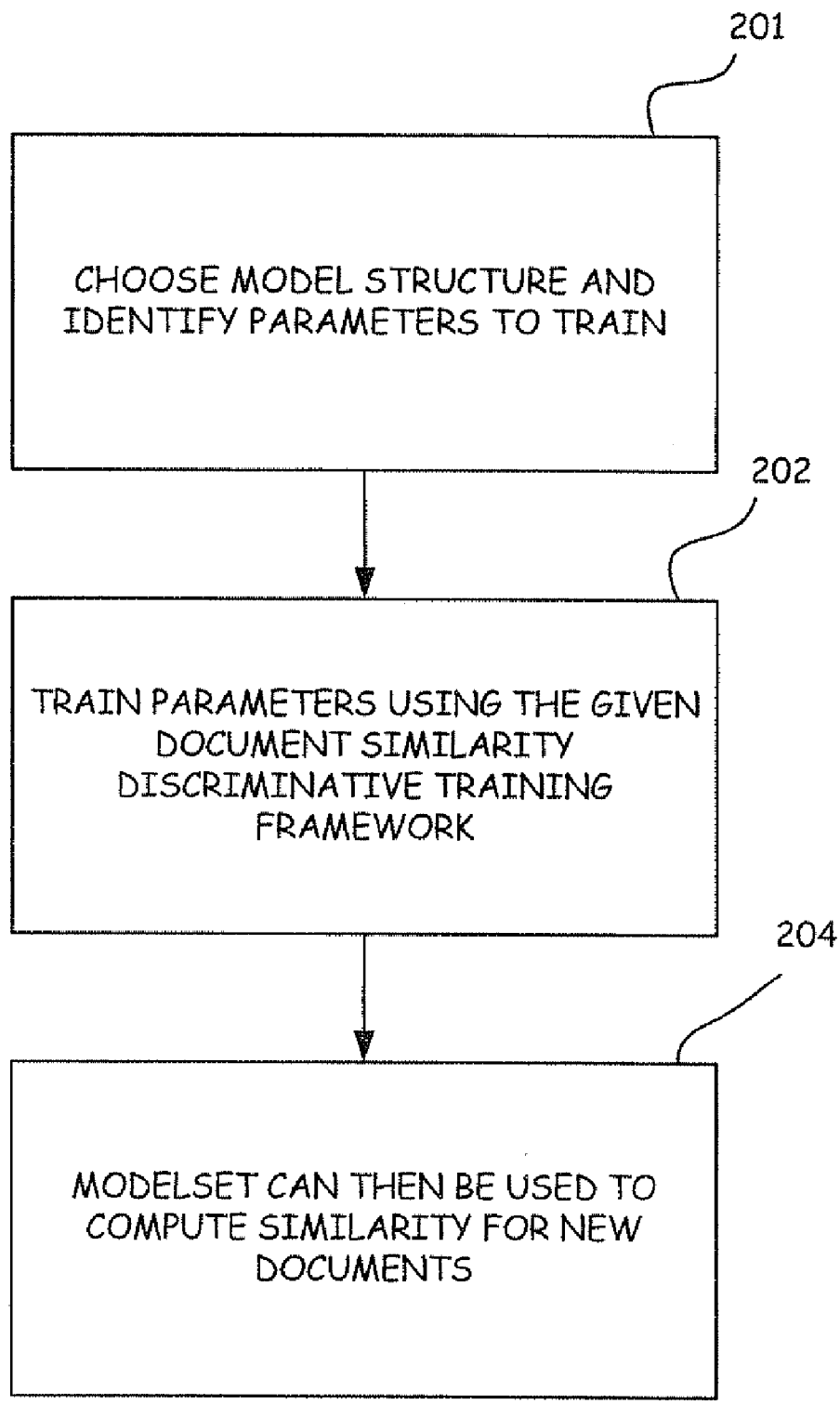
FIG. 2 is a flow chart for discriminatively training and implementing an ensemble of models used for document similarity.

One aspect herein described is a generalized discriminative training framework for reconciling the training and evaluation objectives for document similarity. Referring to FIG. 2, at step 201 a model structure (e.g. PLSA, LSA, VSM (Vector Space Modeling), etc.) is decided upon including identifying what parameters need to be trained. At step 202, the parameters are trained using the given document similarity discriminative training framework. At step 204, the modelset can then be used to compute similarity for new documents.

Referring back to step 202, prior information about document relations and non-relations, are used to discriminatively train an ensemble of document similarity classification models. This supervised information source is used to train the modelset to not only learn how to better classify related documents, but additionally, to reduce competition with classifiers of unrelated documents.

Of the many document similarity techniques proposed in the literature, VSM is arguably the most common. In VSM, each document is represented by a vector $x^i$, where $x_k^i = TF(d_i, w_k) \times \sqrt{IDF(w_k)}$ is commonly used to represent the relative frequency of word (i.e., term) $w_k$ in document $d_i$. Here $$TF(d_i, w_k) = P(w_k|d_i) = n(d_i, w_k) / \sum_{k'=1}^{K} n(d_i, w_{k'}),$$

called the Term Frequency, is the intradocument word frequency and $IDF(w_k) = \log D/N_D(w_k)$ is the well known Inverse Document Frequency (IDF) global term weighting. $n(d_i, w_k)$ is the number of occurrences of $w_k$ in document $d_i$, D is the number of database documents, and $N_D(w_k)$ is the number of documents in the database in which word Wk occurs at least once. Document similarity can then be computed using the cosine distance measure, $SIM_{VSM}$:

$$SIM_{VSM}(x^1, x^2) = \frac{x^1 \cdot x^2}{|x^1||x^2|} \quad (1)$$

PLSA is a probabilistic approach to LSA. Both LSA and PLSA derive latent semantic factors that allow documents to be conceptualized in a high-level semantic space, however PLSA may be considered as using a more statistically sound foundation. PLSA attempts to discover and model patterns in word co-occurrence by modeling the document-word co-occurrence matrix using the joint distribution, P(d,w), and the latent semantic variable z. Assuming conditional independence of d and w with respect to z, this gives $$P(d_i, w_k) = \sum_{j=1}^{J} P(z_j)P(d_i|z_j)P(w|z_j) \quad (2)$$

The individual PDFs, $P(z_j)$, $P(d_i|z_j)$, $P(w|z_j)$ are trained using Maximum Likelihood (ML) techniques such as Expectation Maximization (EM). The resulting PDFs can then be used to compute a number of measures, including the factor-space representation of each document $[d^i]$, $d_j^i = p(z_j|d_i)$. Note the similarity here with the TF document vector, since TF can be written as $P(w_k|d_i)$ Thus, $d^i$ is referred to as the Expected Factor Frequency (EFF) document vector within this work, where expected emphasizes the fact that $d^i$ is only a probabilistic estimate of the true Factor Frequency vector. PLSA similarity can then be computed using a VSM-inspired approach by computing the cosine distance of the EFF vectors:

$$SIM_{PVSM}(d^1, d^2) = \frac{d^1 \cdot d^2}{|d^1||d^2|}. \quad (3)$$

The above similarity measure requires an EFF representation for unseen query documents in order to compute similarity with documents within a database. Typically, a query document, q, is approximated or folded into the factor space using the PLSA PDFs. One approach is to fix P(w|z) and P(z) and to then use EM to estimate P(z|q). Here, the empirical distribution $\tilde{P}(q,w_k)$ is approximated using the query word counts $n(q,w_k)$. Alternately, the empirical word distribution $\tilde{P}(w_k|q)$ derived from the query TF vector y, $y_k = p(w_k|q) = TF(q,w_k)$ can be used to probabilistically predict a query's representation, using $$P(z_j|q) = \sum_{k=1}^{K} P(z_j|w_k)\tilde{P}(w_k|q)$$

assuming that $P(z_j|w_k,q) \approx P(z_j|w_k)$.

A generalized discriminative training technique will be described for training an ensemble of document models using a training objective that is consistent with the document similarity evaluation task. This is done by using prior knowledge about document relationships to train the ensemble of document models to minimize classification error given this relationship information.

Let $\Lambda = [\lambda^i]$ be an ensemble of target document models representing each document, $d_i$ in a database of D documents. Each model $\lambda^i$ tries to capture the multitude of topics and other bits of information that are useful for determining document similarity for a given document 'i'. Document similarity thus attempts to find the most similar documents to q using the model set $\Lambda$. If some knowledge of inter-document relationships is known during the training of $\Lambda$ then it is hoped that the proposed training algorithm can adjust each model, $\lambda^i$ for each training document, $x_n$, in such a way that:

1. Classification for $x_n$ is improved for $\lambda^i$ if it is related to $x_n$; and
2. More importantly, competitiveness with other classes that are related to $x_n$ is reduced, if $\lambda^i$ is NOT related to $x_n$.

The intention here is to not only train individual document models, $\lambda^i$ to better classify related query documents, but more importantly, to not compete against the classifiers of unrelated documents. For example, if $d_1$ is known not to be related to $d_2$, then training $\lambda^1$ to not compete with $\lambda^2$ will hopefully result in less competition for other unseen query documents related to $d_2$.

Figure 3:
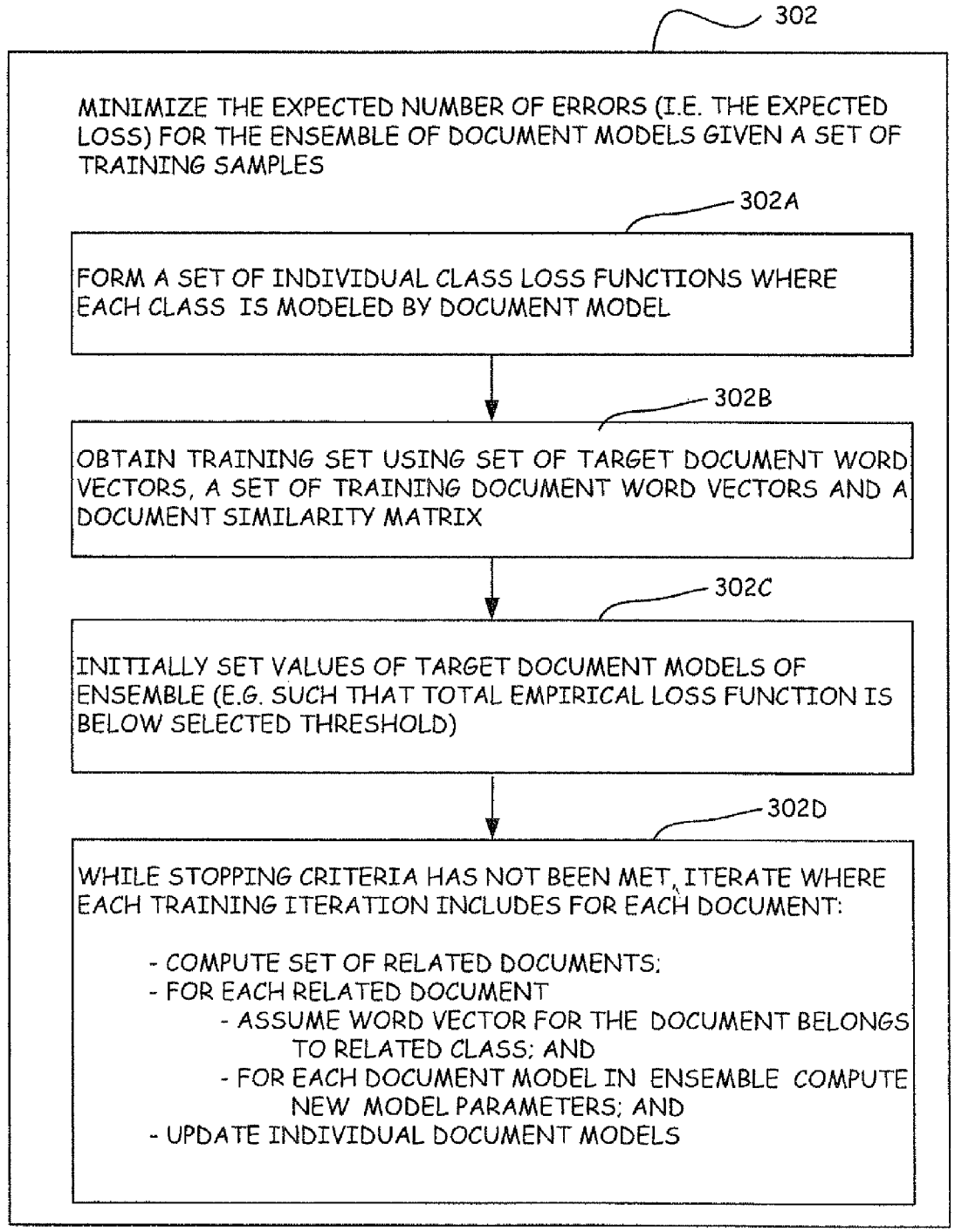
FIG. 3 is a more detailed flow chart for discriminatively training an ensemble of models used for document similarity.

Details related to step 202 are illustrated in FIG. 3. Herein, the training process is exemplified by using the well-known Generalized Probabilistic Descent (GPD) framework, the details of which are generally well known. Generally, at step 302, training (herein GPD training) is applied here to minimize the expected number of errors (i.e. the expected loss) for the ensemble of document models $\Lambda\{\lambda^1, \ldots, \lambda^2\}$, given a set of training samples, $X=\{x_1, \ldots, x_N\}$. Expected loss is defined here in terms of a set of individual class loss functions that are formed at step 302A, $l_a(x_n)$, that measure the loss of classifying query $x_n$ as class $C_a$, where class $C_a$ is modeled by document model $\lambda^a$. Since $x_n$ can be related to multiple document classes, the expected loss is defined using the per-sample average loss as follows:

$$L(\Lambda) = \frac{1}{N} \sum_{n=1}^{N} \frac{\sum_{a=1}^{A} l_a(x_n)\delta(x_n \in C_a)}{\sum_{a=1}^{A} \delta(x_n \in C_a)} \tag{4}$$

Here the indicator function $\delta(\text{cond})=1$ when cond is true (1) and false (0) otherwise. Averaging is performed on a per-training sample basis across all document classes that are related to a training sample. This allows multiple relationships to be considered per training sample while preventing the expected loss function from being dominated by training samples with many related classes. The process is to minimize the number of errors, using the approach shown below.

The class loss function is defined using a smoothed step function parameterized on the class discrimination function, $d_k(x_n)$, which in turn is derived from the class distance function $g_a(x_n)$.

$$l_a(x_n) = \frac{1}{1 + e^{-(\alpha d_a(x_n)+\beta)}} \tag{5}$$

$$d_k(x_n) = g_a(x_n) - \left[\frac{\sum_{b=1}^{A}[g_b(x_n)\delta(x_n \notin C_b)]^{-\mu}}{\sum_{b=1}^{A}\delta(x_n \notin C_b)}\right]^{-\frac{1}{\mu}} \tag{6}$$

$$g_a(x_n) = e^{-\gamma SIM(\lambda^a, x_n)} \tag{7}$$

The functional form used for $d_k(x_n)$ provides a smoothed min( ) function, where smoothness is controlled by $\mu$. The class distance function, $g_a(x_n)$, is defined in terms of the model-specific document similarity measure, $SIM(d_1, d_2)$—the exponential is arbitrarily used here to convert a similarity into a distance. Then, GPD theory states that the empirical expected loss function can then be minimized by using the iterative gradient-descent update equation $$\Lambda(t+1) = \Lambda(t) - \epsilon(t)\nabla l_k(x_n) \tag{8}$$

where the modelset is updated once for each training example in $x_n \in X$ at each iteration t and $\epsilon(t)$ is a monotonically decreasing function. If model parameters are considered independent, then using equations 5-8, it can be shown that document model, $\lambda^b$, can be minimized using the per-model-parameter update equation:

$$\lambda_j^b(t+1) = \lambda_j^b(t) - \epsilon(t)\frac{\partial l_a(x_n)}{\partial \lambda_j^b} \tag{9}$$

where $$\frac{\partial l_a(x_n)}{\partial \lambda_j^b} = \alpha l_a(x_n)\{1 - l_a(x_n)\}\frac{\partial d_a(x_n)}{\partial \lambda_j^b} \tag{10}$$

$$\frac{\partial d_a(x_n)}{\partial \lambda_j^b} = -\gamma g_b(x_n) \times \frac{\partial SIM(\lambda^a, x_n)}{\partial \lambda_j^b} \times \Psi_{ab} \tag{11}$$

$$\Psi_{ab} = \begin{cases} 1, & a = b \\ -V_{ab}, & \text{else} \end{cases} \tag{12}$$

$$V_{ab} = \frac{1}{C'}\left[\frac{1}{C'}\sum_{c=1}^{A}\left[\frac{g_b(x)}{g_c(x)}\delta(x_n \notin C_c)\right]^{\mu}\right]^{-(1+\mu)/\mu} \tag{13}$$

$$C' = \sum_{c=1}^{A}\delta(x_n \notin C_c) \tag{14}$$

Model training can then be performed using the following procedure as also illustrated in FIG. 3. At step 302B, a training set is constructed using a set of target document word vectors, $R=\{r_1, \ldots, r_D\}$, a set of training document word vectors, $X=\{x_1, \ldots, x_N\}$, and the D×N document similarity matrix, $\Psi$, where $\Psi_{ij}$ is the binary function indicating whether target document i is similar to training document j. An initial set of target document models, $\Lambda$, is bootstrapped appropriately. If desired, random initialization or using an unsupervised clustering algorithm to bootstrap parameters can be used. Then, for each training iteration, t, each training document, n is processed follows:

1. The set of related documents, $\phi=\{\phi_1, \ldots, \phi_S\}$ is computed by selecting all documents where $\Psi_{sn}=1$.
2. For each related document, $\phi_S$ in $\phi$
   (a) Assume $x_n$ belongs to class $C_{\phi_S}$ i.e. $x_n$ is an example of document $\phi_S$.
   (b) Then, for each model $\lambda^i$ in $\Lambda$, the new model parameters, $(\lambda^i)^j_j(t,s)$, are computed using equation 9.
3. Individual document model parameters are then updated to be the average of all individual model parameter updates, using $$\lambda_j^i(t+1) = \frac{1}{S}\sum_{s=1}^{S}(\lambda')^i_j(t,s).$$

Iterative training continues until the change in the total empirical loss function, $L(\Lambda)$, is negligible. However, other forms of stopping criteria can be used such as but not limited to performing a required number of training iterations or based on the change in loss function between iterations.

The above description demonstrates how the ensemble of document models, $\Lambda$, can be trained discriminatively, given a modeling architecture, a document similarity measure, SIM $(d_1, d_2)$, and a document relationship function that allows computation of $\delta(x_n \in C_c)$. The modeling architecture can be any modeling approach, as long as the each model contains document-specific parameters that are suitable for training. The following section will show how the framework above can be applied to the PLSA model structure—a similar procedure can be followed for other model structures.

For PLSA, $SIM_{PVSM}$ in equation 3 can be used for $SIM(d_1, d_2)$, while the document relationship function can be derived from training document similarity annotations.

Defining the modeling architecture however requires a modeling assumption. Here, it is proposed that an individual document can be modeled using $\lambda^i$ with $\lambda^i_j = d^i_j \gamma^i_j$, where $d^i_j$ is the EFF term. $\gamma^i_j$ is an importance weight that reflects the importance of the factor j for discrimination of document i. These factor-importance weights are similar to global term weights, such as IDF weights, but here, the importance weight is trained on a per-document basis. Conceptually, training such a model is equivalent to simply adjusting the position of the EFF document vectors in factor space to maximize discriminability.

The training procedure above can then be used with the following modifications to refine the PLSA model: 1) the initial model set is bootstrapped using standard ML PLSA to estimate $P(z_j|d_i)$, and setting $\gamma^i_j = 1$ for all models, 2) each training document $x_n$ is folded into the factor space using one of the folding approaches mentioned above and 3) the $SIM_{PVSM}$ similarity measure modified to include the $\gamma$ weights where each document includes such a weight, resulting in the weighted VSM similarity:

$$SIM_{GVSM}(d^1, d^2) = \frac{(\gamma^1 \otimes d^1) \cdot d^2}{|\gamma^1 \otimes d^1||d^2|} \quad (15)$$

where $\otimes$ represents an element by element multiplication, and in this example the similarity is that of document $d^1$ to document $d^2$. The similarities of all documents relative to each other in the corpus of known documents $d^i$ can thus be obtained.

Figure 4:
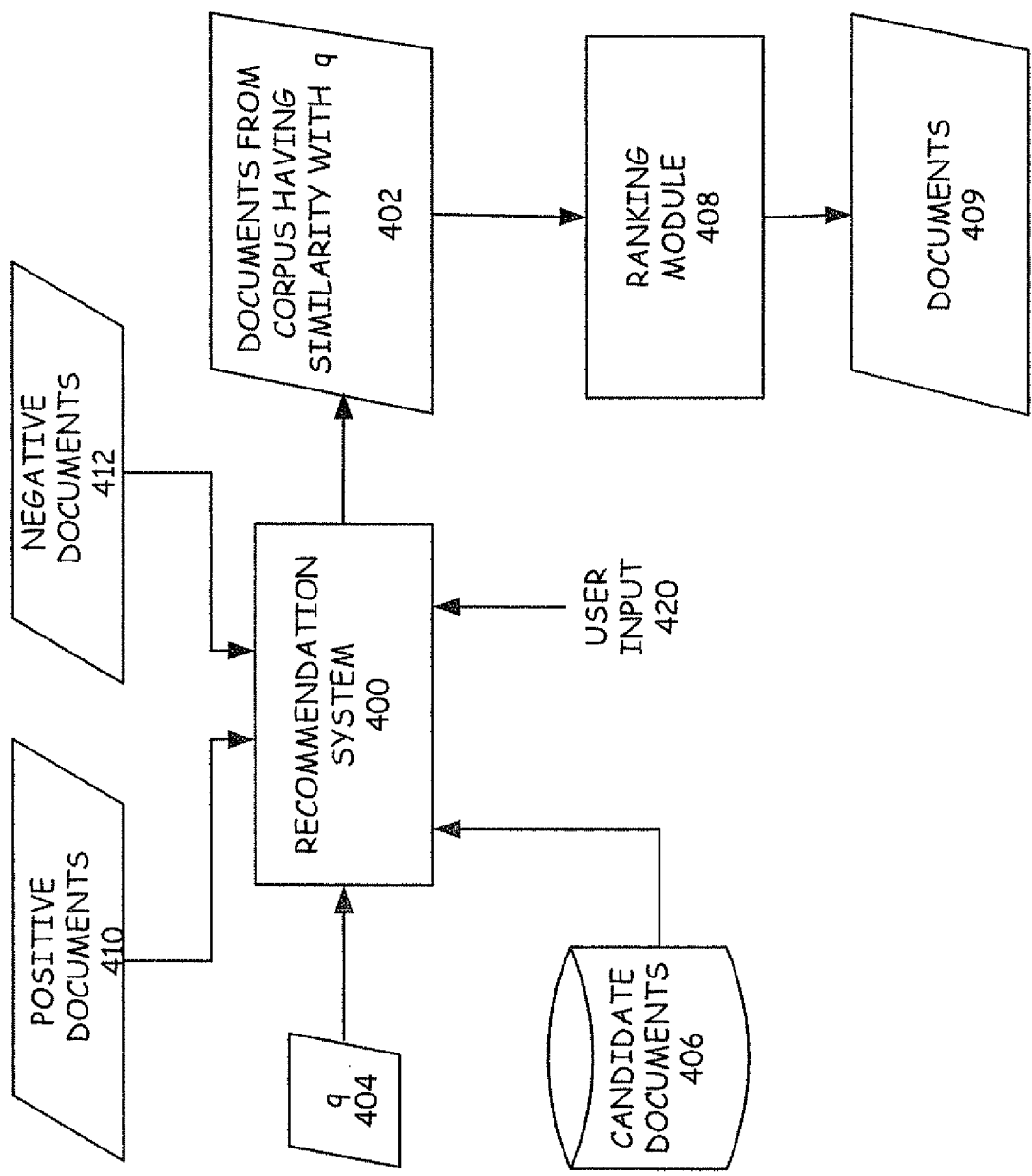
FIG. 4 is a block diagram of a recommendation system.

Note that in Eqn. 15, the gamma weight factor is only applied to $d^1$—on trained parameters are used for $d^2$. Thus, it is possible as described below, Equ. 15 can be written as:

$$SIM_{GVSM}(d^1, q) = \frac{(\gamma^1 \otimes d^1) \cdot q}{|\gamma^1 \otimes d^1||q|} \quad (16)$$

which allows the similarity of a new document q (outside of the training set) to be calculated with respect to document $d^1$, which of course can be extended to any or all of the documents in the set of corpus of known documents. FIG. 4 schematically illustrates a system 400 that can provide as an output 402, the similarity of new document q 404 relative to one or more documents of the corpus of known documents $d^i$ 406. Output 402 can be then be provided to a ranking module 408 that orders the documents of which similarity has been calculated by their similarity score. Thresholding can be used to provide one or more documents 409 having the desired similarity to the document q 404. If desired, document q 404, can be added to corpus 406 using the technique described above.

In a further embodiment also illustrated in FIG. 4, the recommendation system 400 can achieve greater accuracy if a user provides examples of documents that are 'interesting'—here called positive documents $P=\{p_1, \ldots, p_N\}$ 410, and 'not interesting' here called negative documents $N=\{n_1, \ldots, n_M\}$ 412. Given the set of positive documents 410 and the set of negative documents 412, system 400 can then calculate the similarity between the set of positive documents 410 and all candidate documents D in the corpus of known documents 406. First, the similarities are computed between all positive documents, $p_i$, and candidate documents, $d_j \Rightarrow SIM(p_i, d_j)$. Additionally the similarities are computed between all negative documents, $n_i$, and candidate documents, $d_j \Rightarrow SIM(n_i, d_j)$. The set-based similarity, R(P,N,D) is then computed using the equation:

$$R(P,N,D) = A_P(K_P(R_P(P,D))) + A_N(K_N(R_N(N,D)))$$

$$R_P(P,D) = [r_P(P,d_1), \ldots, r_P(P,d_K)]$$

$$R_N(N,D) = [r_N(N,d_1), \ldots, r_N(N,d_K)]$$

$$A_N(R) = [a_N(r_1), \ldots, a_N(r_K)]$$

$R_P(P,D)$ computes similarity scores between positive documents and candidate documents and is given by:

$$r_P(P,d_K) = F[S(t_1, d_K), \ldots, S(t_N, d_K)]$$

where F is a fusion function, and is used to combine the similarity scores between a candidate document and each of the positive documents. It was found that the Min function gave good performance, however other fusion functions could be used, including:

$$F_1(P, d_k) = \min\{S(t_1, d_k), \ldots, S(t_N, d_k)\}$$

$$F_2(P, d_k) = \frac{1}{N} \sum_n \beta e^{-\alpha S(t_n, d_k)}$$

$$F_3(P, d_k) = \left[\sum_n (S(t_n, d_k))^{-\alpha}\right]^{-1/\alpha}$$

where $\alpha$ and $\beta$ are arbitrarily chosen scaling constants.

$R_N(N,D)$ computes similarity scores between positive documents and candidate documents, and is similar to $R_P(P,D)$. However, in a typical system, $R_N(N,D)$ differs from $R_P(P,D)$ in terms of the choice of the fusion function, F.

If desired, set normalization operations can be performed as indicated above by $K_P(\ )$, $K_N(\ )$. It was found that mean/variance normalization gave good performance. However, other set normalization operations could be used, including: mean normalization; mean/variance normalization; Gaussian distribution warping; Skew/Kurtosis warping/normalization.

$a_N(r)$ is a scaling function and is used to appropriately scale the positive and negative scores for the purpose of combination. Both the linear and the sigmoid scaling functions shown below were found to yield acceptable performance.

$$a_1(r) = l_1 r + l_2$$

$$a_2(r) = \frac{l_3}{1 + e^{-l_1 r + l_2}}$$

where $l_1, l_2, l_3$ are arbitrarily chosen constants.

Figure 5:
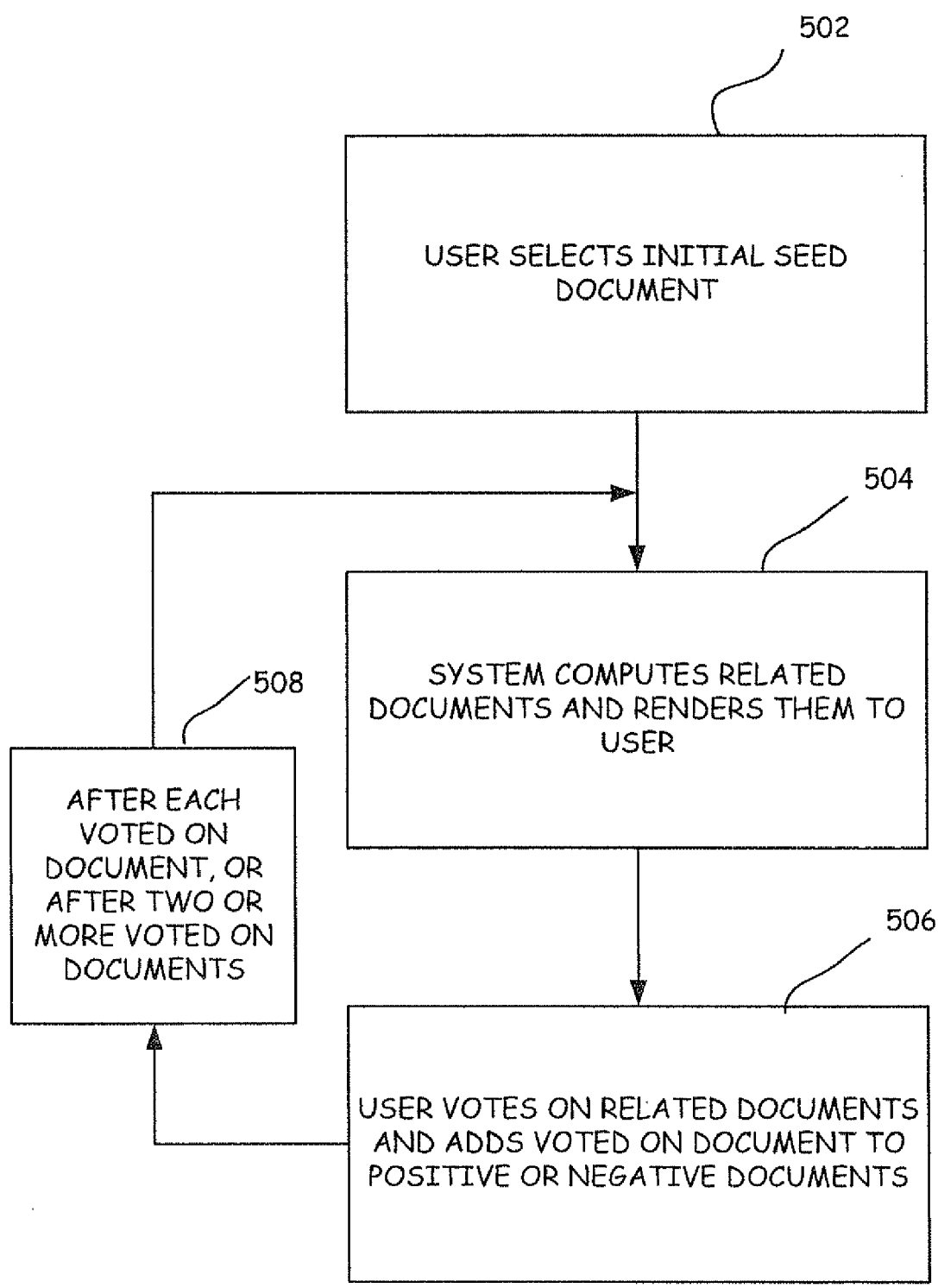
FIG. 5 is a flow chart for recommending documents.

In a further embodiment, a user can guide recommendation system 400 based on indications of liking or disliking recommended documents. In FIG. 4, user input is indicated at 420. An exemplary method of operation 500 is illustrated in FIG. 5 where system 400 can store positive documents $P=\{p_1, \ldots, p_N\}$ 410 that are determined to be of interest to the user and negative documents $N=\{n_1, \ldots, n_M\}$ 412 that are determined not to be of interest to the user. System 400 also has access to candidate documents D in the corpus of known documents 406.

Beginning at step 502, the user selects an initial seed document that he/she likes, which is designated as $t_1$. At step 504, system 400 computes the set of related documents R(P,N,D), which are (or a portion thereof are) rendered to the user. At step 506, the user votes on document(s) $d_k$ indicating whether or not he/she likes the document(s), and if the user likes a particular document the document gets added to the set of positive documents 410. Likewise, if the user dislikes a particular document, the document gets added to the set of negative documents 412. At step 508, in one embodiment, each time the user votes on a document, the set of related documents, R(P,N,D) is recomputed and the process returns to step 504. In an alternative embodiment, the user can vote on two or more documents before the set of related documents, R(P,N,D) is recomputed and the process returns to step 504. Using the method of FIG. 5, the user can refine/guide the recommendation system 400 to recommend content they are most interested in.

When the similarity of documents is ascertained, there can also be other useful information that can be obtained. For instance, it is possible to obtain common "keywords", which can be used in some applications such as query searching. These keywords typically comprise metadata information in that they can be referenced or accessed separately from the terms present in the document.

Figure 6:
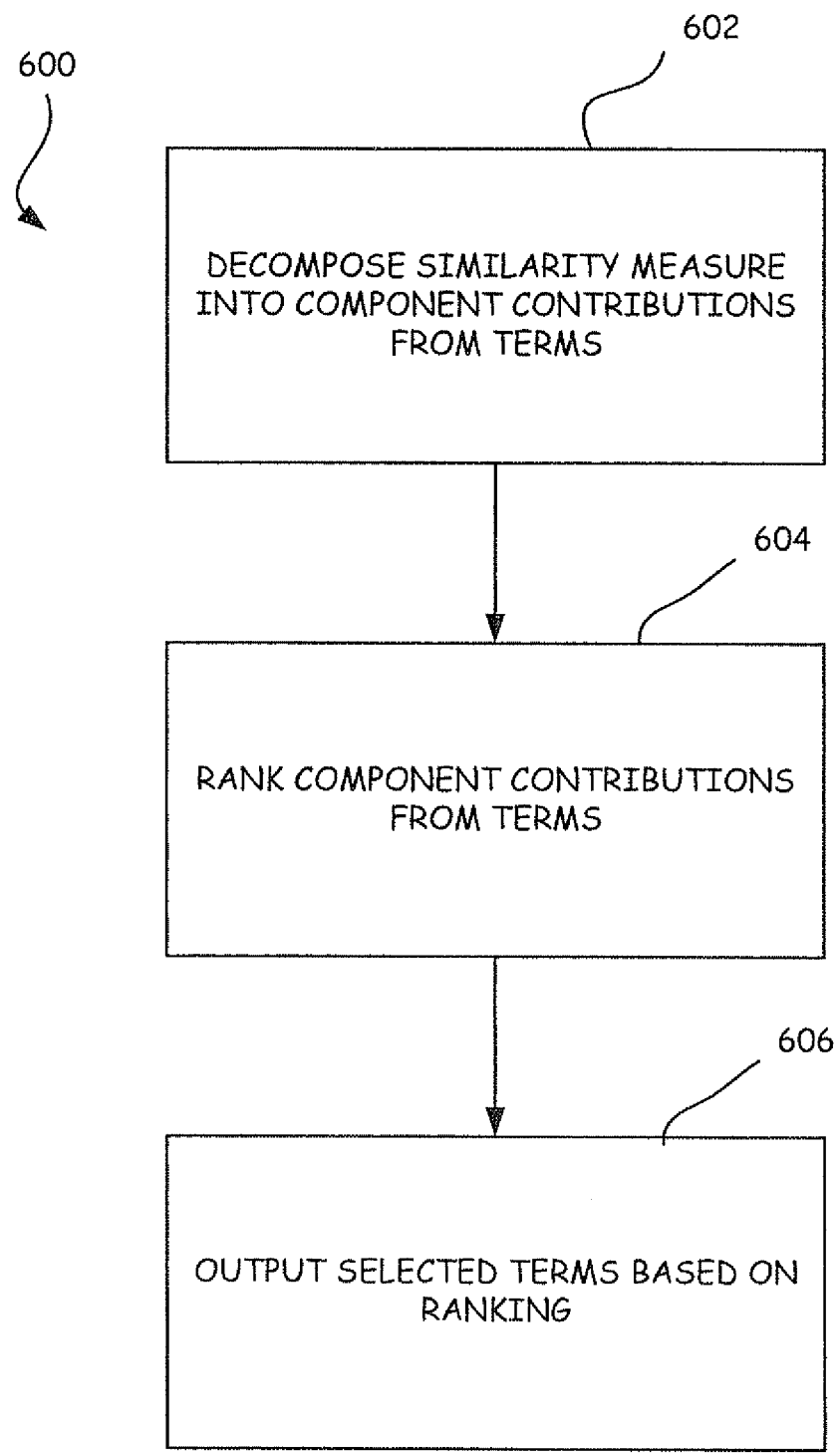
FIG. 6 is a flow chart for obtaining keywords using document similarity.

A method 600 of keyword extraction is illustrated in FIG. 6. Given a similarity measure S for a pair of related documents, $d_k$, and q, automatic keyword extraction begins with decomposing the similarity measure S into its individual terms at step 602. The contribution of each term to the total similarity measure S is used as a score for each term. The scores are then ranked at step 604 and the top scoring terms are outputted as keywords at step 606. If desired, the keywords can be rendered back to the user, if there is a desire to understand the basis of the similarity of the documents.

Step 602 represents decomposition of the similarity measure if it is directly based on common terms present in both $d_k$, and q, as well as if it is based on terms falling in the same semantic classification or "factor" space. For example, for the Probabilistic Latent Semantic Analysis Similarity Measure, the contribution of each factor, z, can be obtained as follows:

$$S(d, q) = \frac{d \cdot q}{|d||q|}$$

$$S(d, q) = \frac{\sum_z d_z q_z}{|d||q|}$$

$$S(d, q) = \frac{\sum_z d_z \sum_w p(z|w)p(w|q)}{|d||q|}$$

where Z and W correspond to the factor and word variables respectively. In such case, the contribution of each word w, $C_w(d,q)$ can be obtained using:

$$C_w(d, q) = p(w|z)C_z(d, q)$$

$$C_z(d, q) = \frac{d_z \sum_w p(z|w)p(w|q)}{|d||q|}$$

As another example, the contribution of individual words for the TFIDF vector space model similarity measure, as represented by $C_w(d,q)$ can be obtained as shown below:

$$S(d, q) = \frac{d \cdot q}{|d||q|}$$

$$S(d, q) = \frac{\sum_w d_w q_w}{|d||q|}$$

$$C_w(d, q) = \frac{d_w q_w}{|d||q|}$$

This technique is particularly useful for factor-space similarities such as Probablistic Latent Semantic Analysis. Since contributions are first computed in the factor space, z, instead of in the word space W, it is not necessary for a term to appear in both documents in order for it to contribute to the similarity score. All that is required is for two terms to contribute significantly to the same factor. If so, they will have a larger contribution. In this way, terms that are commonly co-located with terms in documents d and q, but that don't actually appear in either d or q can still be output as keywords. For example, for a document that contains the words "doctor" and "patient", it is possible to output the term "medicine" (assuming it falls in the same semantic factor), even though "medicine" does not actually appear in q or d.

Figure 7:
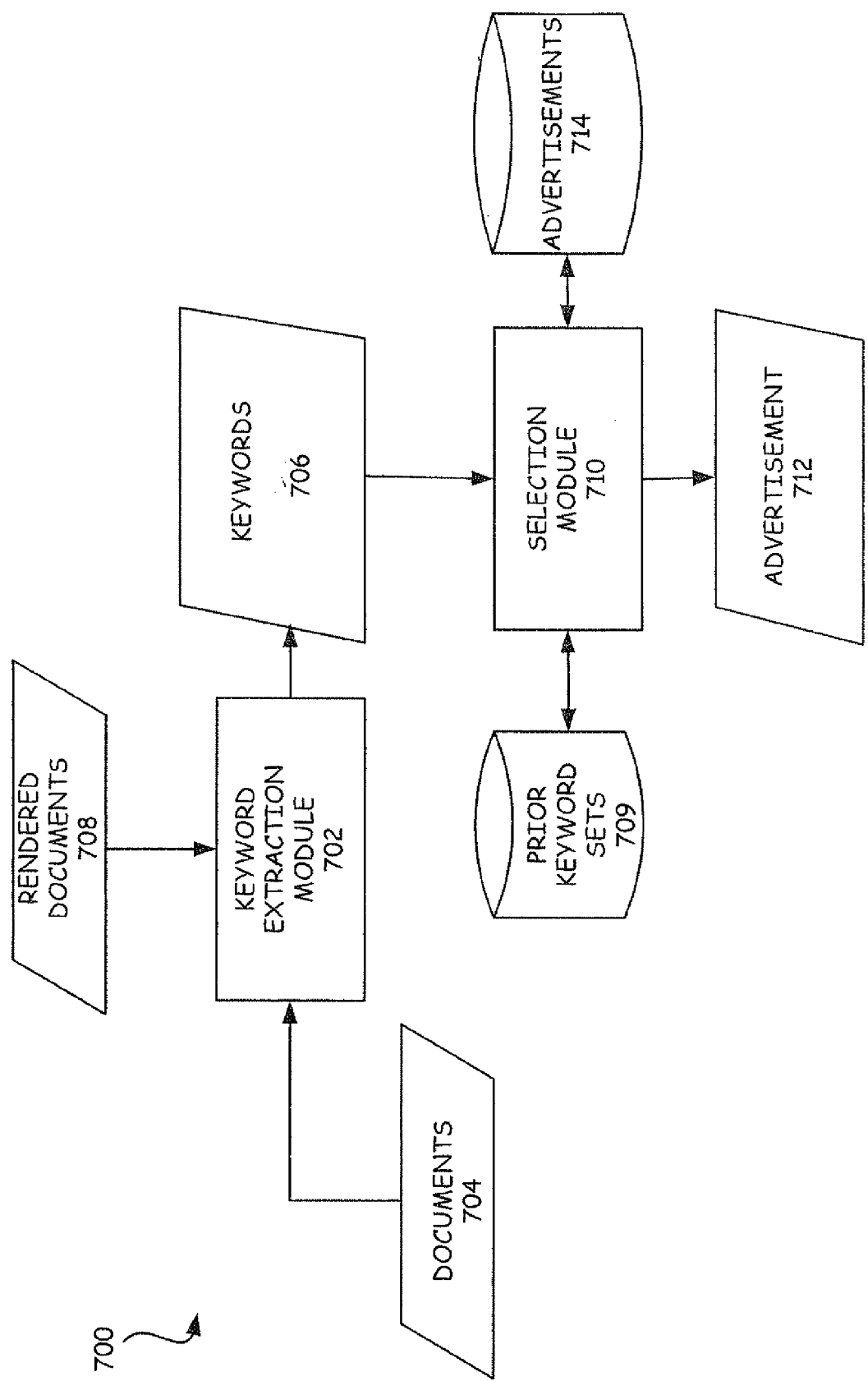
FIG. 7 is a block diagram of a keyword extraction system and an advertisement selection system using keywords.

The ranked keywords, or portion thereof, can be provided to a keyword processing application that can use the keywords to take a particular action. For instance, in a content rendering system 700 illustrated in FIG. 7 that can take many forms including but not limited to a recommendation based or search query based system, a keyword extraction module 702 receives documents 704 (lacking keywords) rendered to the user and obtains therefrom keywords 706 by comparing each document to one or more prior documents 708 rendered to the user, or otherwise known to be of interest to the user. By then processing the keywords 706 (commonly with other sets of keywords 709 from prior rendered documents 708), a selection module 710 can then select an appropriate advertisement 712 from a corpus of advertisements 714 that is then rendered to the user, for example, in a selected portion of the display. The advantage of this system is that content-based advertising can be based on documents that lack keyword metadata information.

Another form of metadata information that can be associated with a document is generally known as a "tag(s)." Tags are terms used to describe the subject matter of the document; however, the term(s) may not actually be present in the document. For instance, tags are often associated with short video or audio clips, particularly when a transcription for the audio is not available. Tags are typically put on by the author and/or a user of the document, and in many instances, a plurality of users of the document. Since the document lacks a transcription, until tag(s) are associated with the document, the document is not searchable/discoverable in many content rendering systems.

Figure 8:
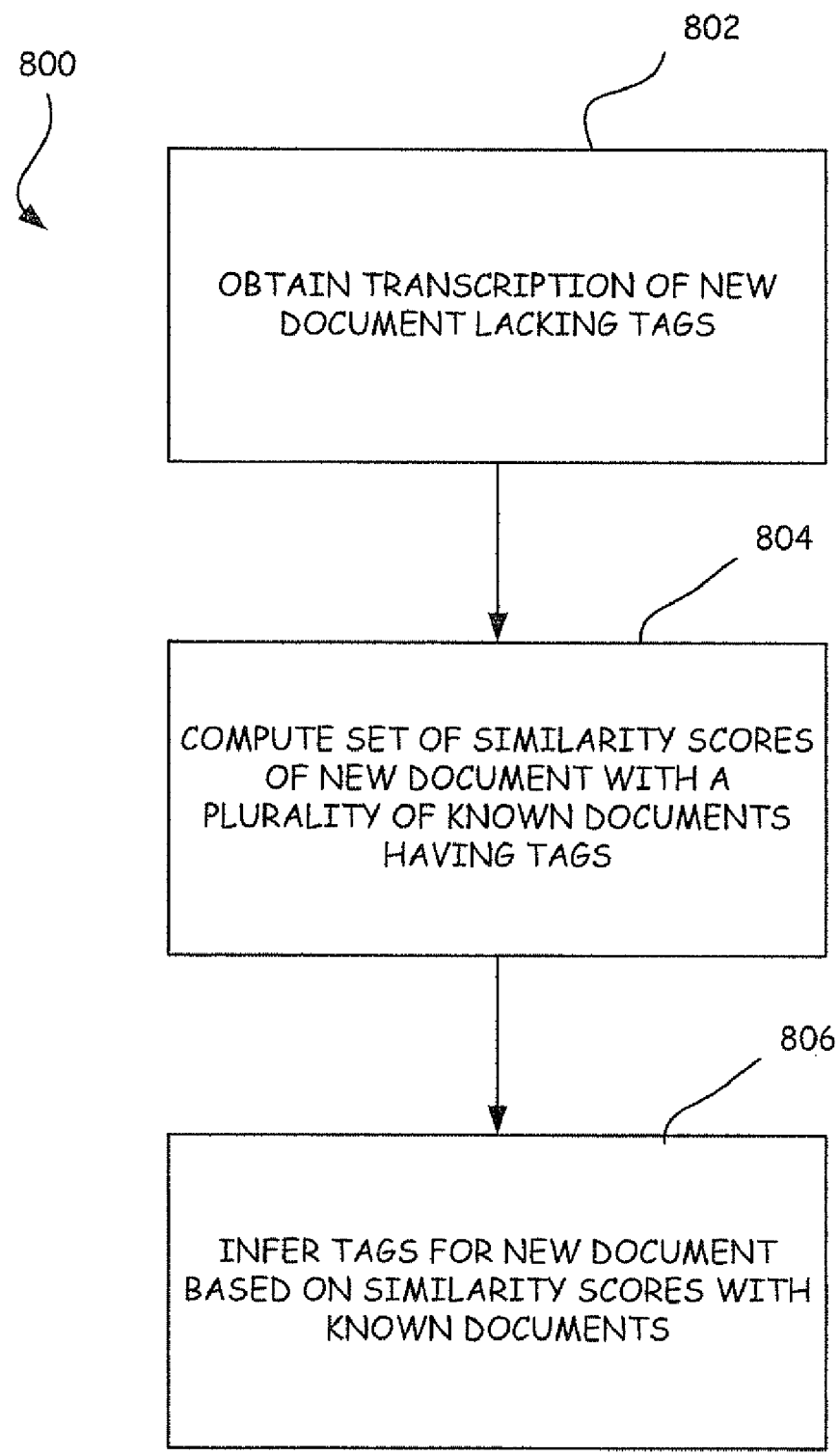
FIG. 8 is a flow chart for inferring tags using document similarity.
Figure 9:
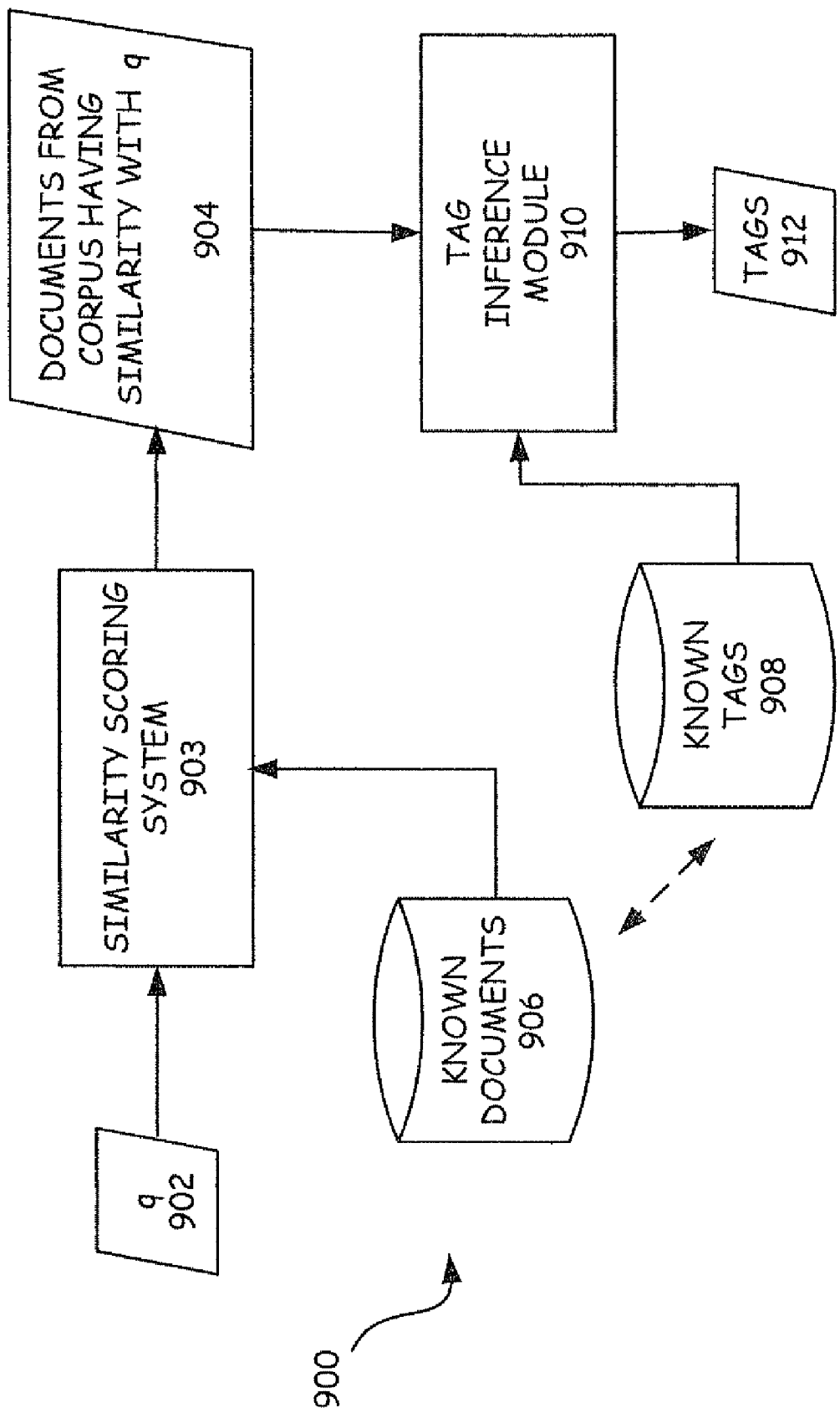
FIG. 9 is a block diagram of a tag inference system.
Figure 10:
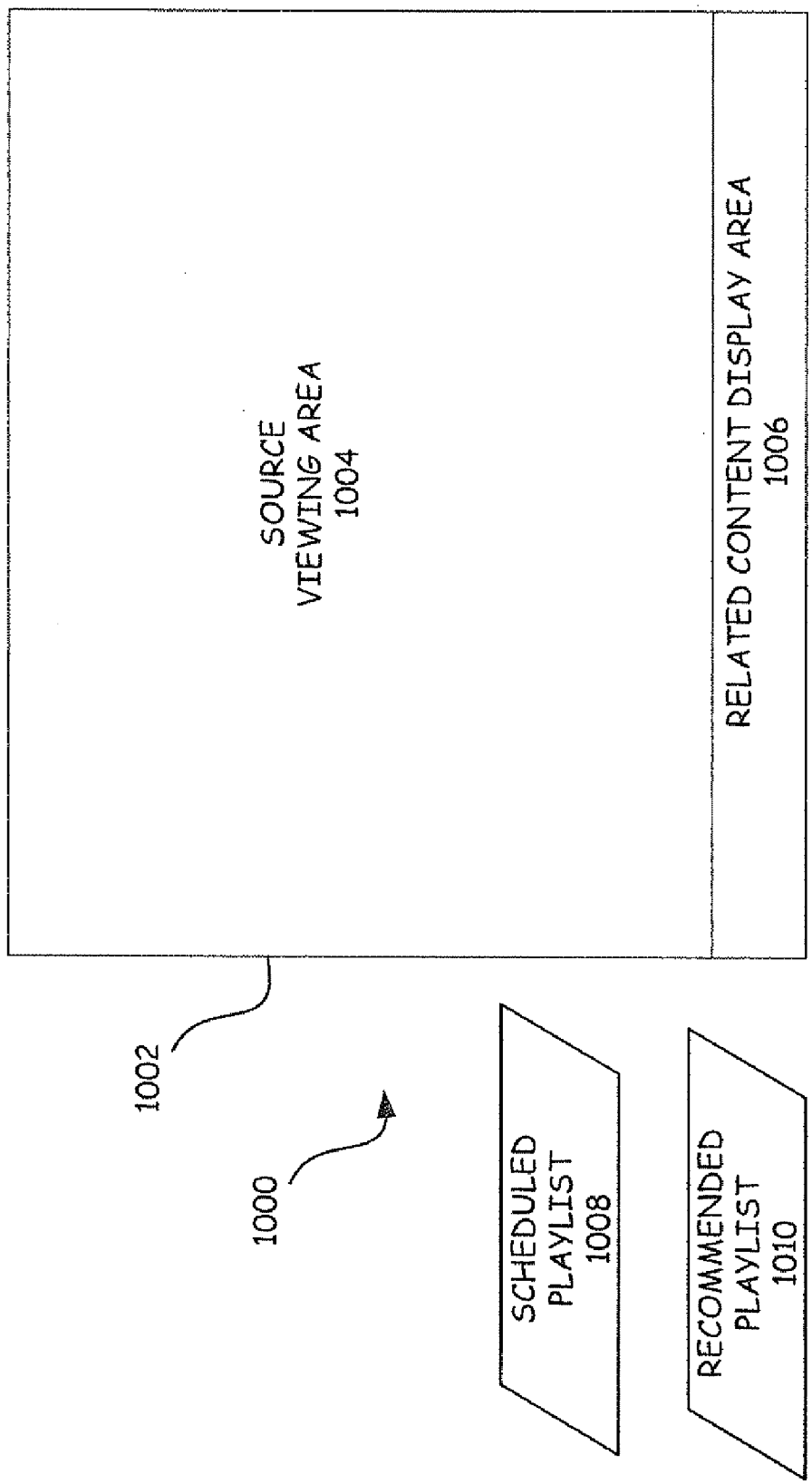
FIG. 10 is schematic representation of a system for rendering documents.

A method 800 of tag inference is illustrated in FIG. 8, while a system 900 for inferring tags is illustrated in FIG. 9. At step 802, a new document q 902 (having no tags) is first processed such as with the system of FIG. 1 to obtain a feature extraction of the document. At step 804, a scoring system 903 uses a similarity measure S to obtain a set of similarity scores 904 of the new document q 902 for a plurality of known documents $d_k$ 906, the known documents 906 each having tag(s) 908. At step 806, a tag inference module 910 receives the set of similarity scores 904 and tag information 908 of the known documents 906, and weights the tags from each of the known documents 906 for the new document q 902 based on their corresponding similarity score, assigning those tags 912 above a selected threshold to the new document q 902. If desired, the tags 912 can be rendered to a user(s) for verification. In a manner similar to that as described above with keywords, tags can also be used as a basis for content-based advertising.

Using one or more of the technologies described above: discriminatively trained similarity measure, automatic keyword extraction and automatic tag generation, it is possible to build a system for consuming video, audio, picture and/or text content on a television or another similar device where a user typically prefers a low level of user-interaction.

In one embodiment, it may be important for a television user to have as little user-interaction as possible in order to preserve a comfortable and enjoyable viewing experience. The traditional television channel is particularly well suited for the television, because it requires very little user interaction. In fact, the only user interaction required by a user is to change channels if they do not like the content on a particular channel.

An exemplary embodiment for a system 1000 for rendering content is represented by display 1002 having a source viewing area 1004 and an area 1006 for displaying related, available content. The system 1000 can be used for watching video on a television or other monitor device. However, it can equally be applied to consuming other types of content (e.g. audio, text, pictures) as well as be embodied on other devices (e.g. hands-free devices, mobile devices).

Using video by way of example only, each video is transcribed (either just before rendering, or by the content provider prior to receipt by system 1000) using automatic speech recognition as illustrated in FIG. 1 to generate the word transcription of the document. This word transcription is then used within the system 1000 for recommending content.

In one exemplary mode of operation, a user selects a video (for example by switching to a channel that is showing a program they like). This video is shown in the source viewing area 1004. The set of documents related to the current source video can then be computed using the recommendation system 400 described above. Related documents can be sourced from a variety of sources, including the Internet, local area network having other forms of content, or a personal document collection (video, audio, pictures, text) of the user.

A list of documents determined to be related to the document being rendered is shown in the related content display area 1006. Listed documents can be sequentially scrolled automatically, where if desired the list can be periodically switched, and/or the list can be manually cycled through by the user.

If the user sees something of interest in the related content display area 1006, the user can selectively add a reference to the document to a stored list 1008 in system 1000, herein referred to as a "scheduled playlist". When the user finishes the current document being rendered, items from the "scheduled playlist" can be selectively or automatically played, as long as the scheduled playlist references documents.

If desired, automatic keyword extraction can be implemented as described above in order to determine the set of keywords that most contribute to the relationship between the current document being rendered and a document referenced in the related content display area 1006, and/or the scheduled playlist. If desired, the keywords can be rendered to the user, for example, in the related content display area 1006 so as to provide the user feedback as to why a particular document has been listed.

In a further embodiment, at the pleasure of the user, the user can also vote positively or negatively for the current document affirmatively providing an indication of interest or disinterest. Doing so adds it to the positive documents 410 or negative documents 412 as described previously.

When a user votes, the set of recommended documents R(P,N,D) is computed. If desired, references to documents from this set can be placed into a special playlist herein referred to as the "recommended playlist" 1010. When the user has finished watching the current document, as well as possibly all documents in their "scheduled playlist" 1008, documents from the "recommended playlist" 1010 can be rendered. It should be noted, a user can be provided with an interface to allow their "scheduled playlist" 1008 and "recommended playlist" 1010 to be rendered at any time. This allows the user to ascertain what will next be rendered and/or what is "coming up" in the future. If desired, the user can affect the shows that will be shown in the future by either selecting documents from the "related content display area" or by expressing interest or disinterest in the current document. However, if the user does nothing, documents will be continually rendered to the user, based on the current contents of the positive documents 410 or negative documents 412. In this way, a user can consume documents from a database such as the Internet in a completely passive fashion, where no interaction by the user is required, and where content is automatically fetched for the user based on their previous choices.

Additionally, using minimal interaction (either queuing document from the related content display area 1006 or by expressing interest or disinterest to the current document), the user can customize the recommendation system 1000. This approach requires considerably less interaction than the traditional search/browsing modes used by Internet portals and other multimedia portals. In particularly, for a television or other monitor, where the display area is scarce, large fonts may be required, making search/browse portals difficult to use.

In a further embodiment, when a user is rendered a document that is particularly interesting, the user can signify to the system that more information related to the current document is requested, for example, by pressing a dedicated button. This will cause the system 1000 to terminate (possibly saving its current state so that the user can come back to it) the current basis of recommending documents (i.e., documents listed in the positive documents 410 and negative documents 412). That is, the sets of positive documents 410 and negative documents 412 will be emptied. The document for which more information was desired will then be added to the positive documents 410. The set of recommended documents R(P,N,D) is then computed and a "recommended playlist" can be provided to the user. Using the methods described above, the user can then move as desired to other related documents.

It should be noted, a user can skip forwards and backwards to future/previous documents at any time. Thus, if the system 1000 recommends a document that the user does not find interesting, they can always skip it.

If desired, automatic tag generation can be performed to generate tags for the current document as described above. The tags can be provided to an advertisement selection module such as that described above and illustrated in FIG. 7. In one embodiment, an advertisement is then automatically played after the current document. Since the advertisement was generated using tags extracted from the current document, there is a much greater chance that the user will be interested in the advertisements.

In yet another embodiment, automatic tag generation can be performed for each document in the positive documents set 410. These tags can be pooled and the most common tags can then be sent to the advertisement selection module.

If desired, automatic tag generation and/or automatic keyword extraction can be performed as described above and used to perform queries into an Internet text-based search engine. For example, when watching a particular episode of a series, the system could query for related news articles on the current show and automatically email them to the user or provide a means for the user to review the related news articles on their monitor.

Figure 11:
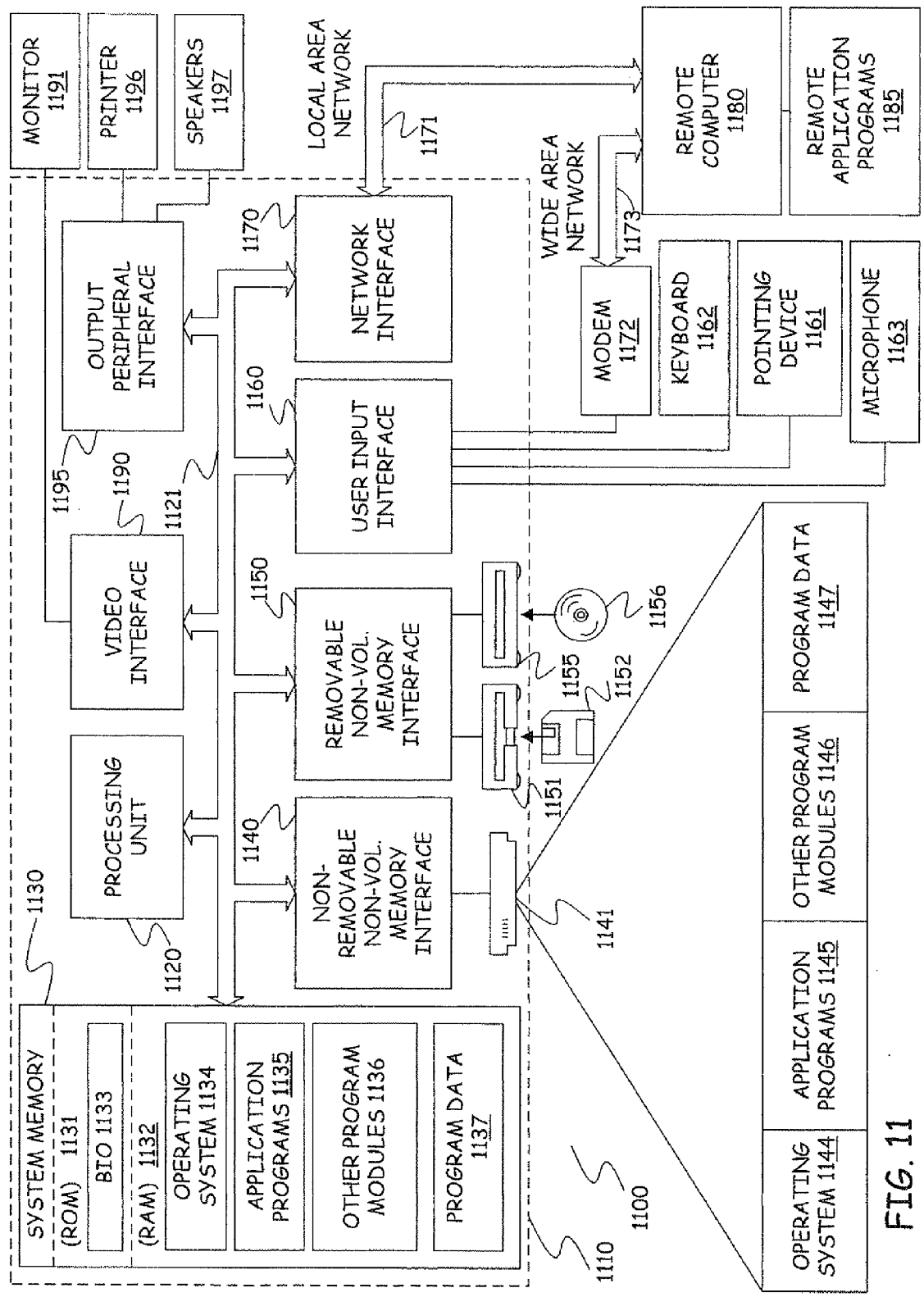
FIG. 11 illustrates an example of a computing system environment.

FIG. 11 illustrates an example of a suitable computing system environment 1100 on which the concepts herein described may be implemented. Nevertheless, the computing system environment 1100 is again only one example of a suitable computing environment for each of these computers and is not intended to suggest any limitation as to the scope of use or functionality of the description below. Neither should the computing environment 1100 be interpreted as having any dependency or requirement relating to any one or combination of components illustrated in the exemplary operating environment 1100.

In addition to the examples herein provided, other well known computing systems, environments, and/or configurations may be suitable for use with concepts herein described. Such systems include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The concepts herein described may be embodied in the general context of computer-executable instructions, such as program modules, being executed by a computer. Generally, program modules include routines, programs, objects, components, data structures, etc. that perform particular tasks or implement particular abstract data types. Those skilled in the art can implement the description and/or figures herein as computer-executable instructions, which can be embodied on any form of computer readable media discussed below.

The concepts herein described may also be practiced in distributed computing environments where tasks are performed by remote processing devices that are linked through a communications network. In a distributed computing environment, program modules may be located in both locale and remote computer storage media including memory storage devices.

With reference to FIG. 11, an exemplary system includes a general purpose computing device in the form of a computer 1110. Components of computer 1110 may include, but are not limited to, a processing unit 1120, a system memory 1130, and a system bus 1121 that couples various system components including the system memory to the processing unit 1120. The system bus 1121 may be any of several types of bus structures including a memory bus or memory controller, a peripheral bus, and a locale bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) locale bus, and Peripheral Component Interconnect (PCI) bus also known as Mezzanine bus.

Computer 1110 typically includes a variety of computer readable media. Computer readable media can be any available media that can be accessed by computer 1110 and includes both volatile and nonvolatile media, removable and non-removable media. By way of example, and not limitation, computer readable media may comprise computer storage media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 1100.

The system memory 1130 includes computer storage media in the form of volatile and/or nonvolatile memory such as read only memory (ROM) 1131 and random access memory (RAM) 1132. A basic input/output system 1133 (BIOS), containing the basic routines that help to transfer information between elements within computer 1110, such as during start-up, is typically stored in ROM 1131. RAM 1132 typically contains data and/or program modules that are immediately accessible to and/or presently being operated on by processing unit 1120.

FIG. 11 illustrates operating system 1134, application programs 1135, other program modules 1136, and program data 1137. Herein, the application programs 1135 (e.g. system 1000), program modules 1136 (e.g. recommendation system 400, ranking module 408, etc.) and program data 1137 (e.g. documents 406, 409, 410, 412, etc.) implement one or more of the concepts described above.

The computer 1110 may also include other removable/non-removable volatile/nonvolatile computer storage media. By way of example only, FIG. 11 illustrates a hard disk drive 1141 that reads from or writes to non-removable, nonvolatile magnetic media, a magnetic disk drive 1151 that reads from or writes to a removable, nonvolatile magnetic disk 1152, and an optical disk drive 1155 that reads from or writes to a removable, nonvolatile optical disk 1156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 1141 is typically connected to the system bus 1121 through a non-removable memory interface such as interface 1140, and magnetic disk drive 1151 and optical disk drive 1155 are typically connected to the system bus 1121 by a removable memory interface, such as interface 1150.

The drives and their associated computer storage media discussed above and illustrated in FIG. 11, provide storage of computer readable instructions, data structures, program modules and other data for the computer 1110. In FIG. 11, for example, bard disk drive 1141 is illustrated as storing operating system 1144, application programs 1145, other program modules 1146, and program data 1147. Note that these components can either be the same as or different from operating system 1134, application programs 1135, other program modules 1136, and program data 1137. Operating system 1144, application programs 1145, other program modules 1146, and program data 1147 are given different numbers here to illustrate that, at a minimum, they are different copies.

A user may enter commands and information into the computer 1110 through input devices such as a keyboard 1162, a microphone 1163, and a pointing device 1161, such as a mouse, trackball or touch pad. These and other input devices are often connected to the processing unit 1120 through a user input interface 1160 that is coupled to the system bus, but may be connected by other interface and bus structures, such as a parallel port or a universal serial bus (USB). A monitor 1191 or other type of display device is also connected to the system bus 1121 via an interface, such as a video interface 1190.

The computer 1110 may operate in a networked environment using logical connections to one or more remote computers, such as a remote computer 1180. The remote computer 1180 may be a personal computer, a hand-held device, a server, a router, a network PC, a peer device or other common network node, and typically includes many or all of the elements described above relative to the computer 1110. The logical connections depicted in FIG. 11 include a locale area network (LAN) 1171 and a wide area network (WAN) 1173, but may also include other networks. Such networking environments are commonplace in offices, enterprise-wide computer networks, intranets and the Internet.

When used in a LAN networking environment, the computer 1110 is connected to the LAN 1171 through a network interface or adapter 1170. When used in a WAN networking environment, the computer 1110 typically includes a modem 1172 or other means for establishing communications over the WAN 1173, such as the Internet. The modem 1172, which may be internal or external, may be connected to the system bus 1121 via the user-input interface 1160, or other appropriate mechanism. In a networked environment, program modules depicted relative to the computer 1110, or portions thereof, may be stored in the remote memory storage device. By way of example, and not limitation, FIG. 11 illustrates remote application programs 1185 as residing on remote computer 1180. It will be appreciated that the network connections shown are exemplary and other means of establishing a communications link between the computers may be used.

It should be noted that the concepts herein described can be carried out on a computer system such as that described with respect to FIG. 11. However, other suitable systems include a server, a computer devoted to message handling, or on a distributed system in which different portions of the concepts are carried out on different parts of the distributed computing system.

Although the subject matter has been described in language specific to structural features and/or methodological acts, it is to be understood that the subject matter defined in the appended claims is not necessarily limited to the specific features or acts described above as has been determined by the courts. Rather, the specific features and acts described above are disclosed as example forms of implementing the claims.

What is claimed is:

1. A method for training document similarity models, the method comprising:
   obtaining a set of training samples;
   obtaining prior information of document relations and non-relations for the set of training samples, wherein the prior information of document relations comprises information indicating that two or more documents in the set of training samples are considered related to each other, and wherein the prior information of document non-relations comprises information indicating that two or more documents in the set of training samples are not considered related to each other; and
   discriminatively training an ensemble of document similarity classification models using the set of training samples and using the prior information of document relations and non-relations using a processor of a computer, wherein the ensemble of document similarity classification models are discriminatively trained based at least in part on prior information of non-relation between a first document and a second document in the set of training samples such that a first classification model configured to determine document similarity with respect to the first document does not compete with a second classification model configured to determine document similarity with respect to the second document.

2. The method of claim 1 and further comprising:
   applying discriminative training framework to probabilistic latent semantic analysis to create a discriminatively trained probabilistic latent semantic analysis similarity measure.

3. The method of claim 2 and further comprising:
   applying discriminative training framework to latent semantic analysis to create a discriminatively trained latent semantic analysis similarity measure.

4. The method of claim 1 wherein training includes minimizing an expected number of errors for the ensemble of document similarity classification models for the set of training samples.

5. The method of claim 4 wherein minimizing an expected number of errors for the ensemble of document similarity classification models comprises:
   forming a set of individual class loss functions where each class is modeled by document model;
   obtaining the training set using a set of target document word vectors, a set of training document word vectors and a document similarity matrix;
   initially setting values of target document models of the ensemble; and
   while a stopping criteria has not been met, iterate where each training iteration includes for each document:
      computing a set of related documents;
      for each related document.
         assume a word vector for the document belongs to a related class; and
         for each document model in ensemble compute new model parameters; and
      update individual document models.

6. A document recommendation system comprising:
   a set of positive documents determined to be of interest to a user;
   a set of negative documents determined to not be of interest to the user;
   a plurality of candidate documents; and
   a module configured to calculate similarity scores of each document in the set of positive documents relative to the plurality of candidate documents and to calculate similarity scores of each document in the set of negative documents relative to the plurality of candidate documents, and wherein the module receives a new document apart from the plurality of candidate documents, calculates a similarity score, using a processor, of the new document relative to each of the plurality of candidate documents using a measure of discriminatively trained similarity associated with each of the plurality of candidate documents, and outputs a reference to at least one of the plurality of candidate documents based on the calculated similarity scores.

7. The document recommendation system of claim 6, wherein the new document comprises at least one of an audio, video, and image data.

8. The document recommendation system of claim 6 wherein the module is configured to output a reference to at least one of the candidate documents that are considered similar based on the calculated similarity scores of the new document relative to each of the candidate documents.

9. The document recommendation system of claim 6 wherein the module is configured to receive an input from the user indicative of whether the user has an interest or not in the at least one referenced candidate document, and wherein each document of the at least one referenced candidate document is added to the set of positive documents if the user has an interest in the document, or added to the set of negative documents if the user has no interest in the document.

10. The document recommendation system of claim 9 wherein the module is configured to discard contents of the set of positive documents and the set of negative documents and add a currently rendered document to the set of positive documents.

11. The document recommendation system of claim 6 wherein the measure of similarity is based on Latent Semantic Analysis (LSA) or Probabilistic Latent Semantic Analysis (PLSA).

12. The document recommendation system of claim 6 wherein the module is configured to render a recommended document on a first display area of a monitor and render a list of further recommended documents on a second display area of the monitor.

13. The document recommendation system of claim 6 wherein the module is configured to select an advertisement from a set of advertisements based on a recommended document.

14. A system for obtaining metadata related to a document, the system comprising:

a plurality of documents, each document having metadata associated therewith, the metadata comprising at least one of a keyword and tag associated with the document; and a module configured to receive a new document apart from the plurality of documents, generate metadata for the new document, and associate the generated metadata with the new document using a processor, wherein the metadata is generated for the new document based on the metadata associated with one or more of the plurality of documents and based on a similarity score of the new document relative to each of the plurality of documents using a measure of similarity based on a weighting factor associated with each document of the plurality of documents.

15. The document recommendation system of claim 14 wherein the metadata associated with the plurality of documents comprises keywords and wherein the module is configured to determine keywords for the new document based on decomposing at least one of the similarity scores.

16. The document recommendation system of claim 15 wherein the module is configured to rank the similarity scores.

17. The document recommendation system of claim 14 wherein the similarity scores are based on factor space and wherein module is configured to determine keywords for the new document based on decomposing at least one of the similarity scores with respect to the factor space and to terms in the factor space.

18. The document recommendation system of claim 14 wherein the metadata associated with the plurality of documents comprises tags and wherein the module is configured to determine tags for the new document based on inferring tags from the plurality of documents.

19. The document recommendation system of claim 18 wherein the module is configured to rank the similarity scores.

* * * * *